United States Patent Office 2,990,727
Patented July 4, 1961

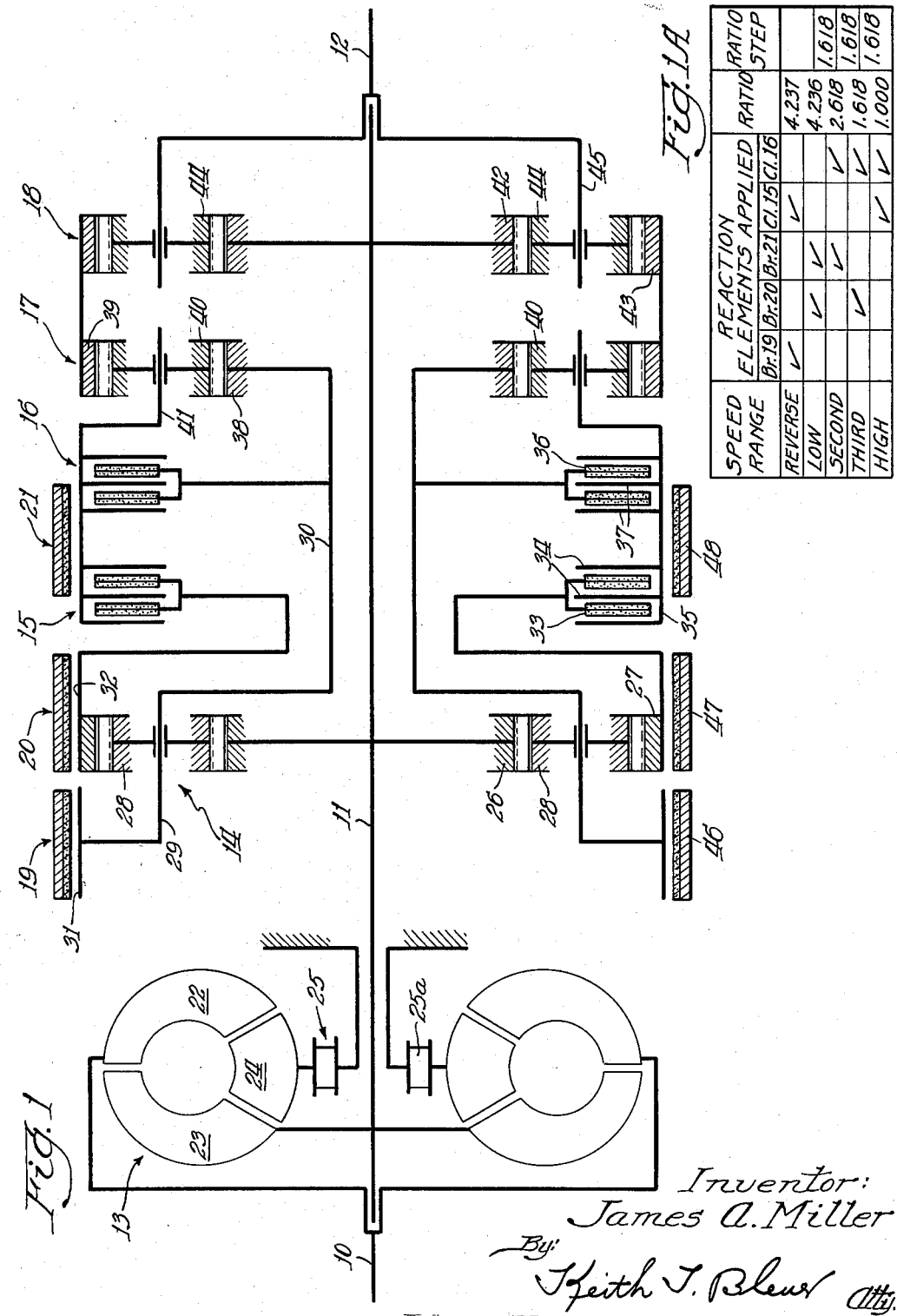

2,990,727
TRANSMISSION
James A. Miller, Grosse Pointe Park, Mich., assignor to Borg-Warner Corporation, Chicago, Ill., a corporation of Illinois
Filed Mar. 21, 1955, Ser. No. 495,459
2 Claims. (Cl. 74—759)

My invention relates to transmissions for automotive vehicles and especially for trucks.

It is an object of the invention to provide an improved transmission having more than the usual two or three speed ratios and which more specifically provides at least four speed ratios and a drive in reverse, rendering the large ratio spread that is required for satisfactorily driving a heavy truck.

It is another object of the invention to provide such a transmission having at least four forward speed ratios, with the construction being such that the ratio steps are substantially equal between the various forward drive ratios.

It is a further object of the invention to utilize a number of gear sets of exactly the same type for thereby reducing manufacturing costs. It is contemplated that the gear sets shall be preferably the simple planet gear type each comprising sun and ring gears and planet gears in mesh therewith, and it is further contemplated that the mentioned embodiment may include three of these identical gear sets.

The invention consists of the novel constructions, arrangements and devices to be hereinafter described and claimed for carrying out the above-stated objects and such other objects as will be apparent from the following description of preferred forms of the invention, illustrated with reference to the accompanying drawings, in which:

FIG. 1 is a schematic illustration of a transmission providing four speeds in forward drive and embodying the principles of the invention; and FIG. 1A is a table setting forth a summary of the operation of the FIG. 1 embodiment showing the various clutches and brakes that are engaged for the various drives and also setting forth, as an example, the various ratios and ratio steps between the drives for one specific transmission of this type.

Referring now in particular to FIGURE 1 of the drawings, the illustrated transmission comprises an input or drive shaft 10, an intermediate drive shaft 11, and an output or driven shaft 12. The transmission is adapted to be used in an automotive vehicle, such as a truck, and the input or drive shaft 10 may be connected with the driving engine (not shown) of the vehicle, and the output or driven shaft 12 may be connected in a suitable manner with the driven road wheels (not shown) of the vehicle.

The transmission comprises in general a hydraulic torque converter 13, a planet gear set 14, a friction clutch 15, a friction clutch 16, a planet gear set 17, a planet gear set 18, a friction brake 19, a friction brake 20 and a friction brake 21.

The hydraulic torque converter 13 comprises a bladed impeller element 22 connected to be driven by the input shaft 10, a bladed turbine element 23 fixed with respect to the intermediate shaft 11 and a bladed stator element 24. The torque converter 13 is constructed in accordance with well-known practice with the blades of the elements 22, 23 and 24 disposed in a common fluid circuit, so that when the impeller element 22 is driven, the turbine element 23 is driven by means of the fluid which is circulated by rotation of the impeller element 22, and the stator element 24 functions to change the direction of flow of the fluid, so that the turbine element is driven at a greater torque than is impressed on the impeller element 22.

A one-way free-wheeling brake 25 is provided for the stator element 24. The brake 25 may be of well-known construction and may comprise a series of sprags 25a disposed between inner and outer cylindrical race surfaces and tiltable to engage the race surfaces to prevent a rotation of the stator element 24 in the reverse direction, that is, in a direction opposite to that of the drive shaft 10.

As is well known with converters of this type, when the rotation of the turbine element increases to a certain speed, the reaction of the fluid on the stator element reverses, thus tending to turn it in the forward direction, and the one-way brake releases. Thereafter, the torque converter functions as a simple fluid coupling driving the turbine element at no increase in torque.

The planet gear set 14 comprises a sun gear 26 fixed to the intermediate shaft 11, a ring gear 27 and planet gears 28 in mesh with the sun and ring gears and rotatably carried by a planet carrier 29. The planet carrier 29 is fixed with respect to a quill shaft 30 disposed concentrically of, and mounted for relative rotation with respect to, the intermediate shaft 11. The carrier 29 is formed with a brake drum 31 thereon, and the ring gear 27 is formed with a brake drum 32 thereon.

The friction clutch 15 comprises a plurality of friction plates 33 fixed with respect to the drum 32 which is formed on the ring gear 27 and a plurality of clutch plates 34 fixed within a brake drum 35 and interleaved with the plates 33. The friction clutch 16 comprises a plurality of friction plates 36 fixed with respect to the quill shaft 30 and a plurality of clutch plates 37 fixed within the brake drum 35 and interleaved with the plates 36. Both of the friction clutches 15 and 16 may be engaged by any suitable means, such as by fluid operated pistons (not shown) which pack the plates in frictional engagement.

The planet gear set 17 comprises a sun gear 38 fixed to the quill shaft 30, a ring gear 39 and planet gears 40 in mesh with the sun and ring gears. The planet gears 40 are rotatably carried by a planet carrier 41 which is connected to the brake drum 35.

The planet gear set 18 comprises a sun gear 42 fixed to the intermediate shaft 11, a ring gear 43 fixed to the ring gear 39 of the planet gear set 17 and planet gears 44 in mesh with the sun gear 42 and the ring gear 43 and rotatably carried by a planet carrier 45, which is connected to the output or driven shaft 12.

The corresponding elements of the planet gear sets 14, 17, and 18 are of the same size and are formed with the same number of gear teeth.

The brake 19 comprises a flexible brake band 46 adapted to frictionally engage the brake drum 31; the brake 20 comprises a flexible brake band 47 adapted to frictionally engage the brake drum 32; and the brake 21 comprises a flexible brake band 48 adapted to frictionally engage the brake drum 35. The friction brakes are engaged in any well-known manner, such as by fluid pressure operated servo-motors (not shown).

The transmission provides a first or low speed forward drive ration, progressively higher intermediate second and third forward drive ratios, a fourth or high forward drive ratio and a reverse drive ratio. In all of the drive ratios, the input shaft 10 is driven by the vehicle engine and drives the intermediate shaft 11 through the torque converter 13, as previously described.

The low speed forward drive through the transmission is completed by engaging the friction brakes 20 and 21. The power flows in two paths, one being through the intermediate shaft 11, the sun gear 42, the planet gears 44 and the planet carrier 45 to the output shaft 12. The other path of power flow is through the intermediate shaft 11, the sun gear 26, the planet gears 28, the planet carrier 29, the quill shaft 30, the sun gear 38, the planet gears 40, the ring gear 39, the ring gear 43, the planet gears 44 and the planet carrier 45 to the output shaft 12. The planet gear set 14 divides the power flow into two paths, one being directly through the shaft 11 and the other being through the sun gear 26; and the planet gear set 18 recombines the power with the sun gear 42 supplying power from one path and the ring gear 43 supplying power from the other path. The brake 20 is effective for holding the ring gear 27 of the planet gear set 14 against rotation, so that the ring gear 27 constitutes a reaction element for the gear set 14 and causes the gear carrier 29 to be driven in the forward direction at a reduced speed with respect to the shaft 11, with the planet gears 28 planetating within the ring gear 27. The brake 21, which is engaged with the brake 20 for completion of this drive, functions to hold the planet carrier 41 of the planet gear set 17 against rotation, so that the carrier 41 constitutes a reaction element for the gear set 17. The sun gear 38 is driven from the carrier 29 through the quill shaft 30, and the planet gears 40 in mesh with the sun gear 38 drive the ring gear 39 in the reverse direction at a decreased speed with respect to that of the sun gear 38. The ring gear 43 of the gear set 18 is connected with the ring gear 39 and thus is driven in the reverse direction. The result of the rotation of the sun gear 42 driving in the forward direction at the same speed as the shaft 11 and the rotation of the ring gear 43 driven in the reverse direction at a relatively low speed is to cause the planet carrier 45 and the output shaft 12 to rotate forwardly at a relatively low speed with respect to the intermediate shaft 11.

The transmission is changed from low speed forward drive to intermediate second speed drive by releasing the brake 20 and engaging the clutch 16, allowing the brake 21 to remain engaged. In this case, a single path of power flow exists, the power flowing through the intermediate shaft, the sun gear 42, the planet gears 44, and the planet carrier 45 to the output shaft 12. The clutch 16, engaged for this drive, functions to connect together the sun gear 38 and the planet carrier 41 of the planet gear set 17, thus locking up the gear set 17 so that all of its parts will be non-rotative with respect to each other. The brake 21 is effective on the drum 35 connected to the carrier 41 and thus functions to hold the carrier 41 as well as the other parts of the planet gear set 17 fixed against rotation. The ring gear 43, being connected to the ring gear 39 of the planet gear set 17, is thus held fixed and functions as the reaction element for the planet gear set 18. Since the ring gear 43 is now fixed instead of being rotated reversely as for low speed forward drive, the carrier 45 and the shaft 12 are driven at a speed in the forward direction which is higher than their speeds in the low speed forward drive, and the speed reduction is due solely to the action of the gear set 18.

The transmission is changed from second speed forward drive to third speed forward drive by releasing the brake 21 and engaging the brake 20, allowing the clutch 16 to remain engaged. As in the case of the low speed forward drive, the power flows in two paths through the transmission, one being through the intermediate shaft 11, the sun gear 42, the planet gears 44, and the planet carrier 45 to the output shaft 12. The other path of power flow is through the intermediate shaft 11, the sun gear 26, the planet gears 28, the planet carrier 29, the quill shaft 30, the sun gear 38, the planet gears 40, the ring gear 39, the ring gear 43, the planet gears 44 and the planet carrier 45 to the output shaft 12. The planet gear set 14 divides the power flow into two paths, one being directly through the shaft 11 and the other being through the sun gear 26; and the planet gear set 18 recombines the power with the sun gear 42 supplying power from one path and the ring gear 43 supplying power from the other path. The brake 20 is effective for holding the ring gear 27 of the planet gear set 14 against rotation, so that the ring gear 27 constitutes a reaction element for the gear set 14 and causes the carrier to be driven in the forward direction at a reduced speed with respect to the shaft 11, with the planet gears 28 planetating within the ring gear 27. The clutch 16, which is engaged with the brake 20 for completion of this drive, functions to lock up the planet gear set 17, so that the elements of the set 17 all rotate together at the same speed and at the she speed of the carrier 29 driving the sun gear 38. The ring gear 43 of the gear set 18 is connected with the ring gear 39 and thus rotates in the forward direction and at the same speed as the elements of the planet set 17. The result of the rotation of the sun gear 42 in the forward direction at the same speed as the shaft 11 and the rotation of the ring gear 43 in the forward direction at a relatively low speed is a driving of the planet carrier 45 forwardly at a speed which is reduced with respect to that of the intermediate shaft 11 but which is higher than that for the low and second forward speed drives.

The transmission is changed from third speed forward drive to fourth or high speed forward drive by releasing the brake 20 and engaging the clutch 15, allowing the clutch 16 to remain engaged. In this case, as in the case of the first and third speed forward drives, the power flows in two paths through the transmission, one path being through the intermediate shaft 11, the sun gear 42, the planet gears 44, and the planet carrier 45 to the output shaft 12. The other path is through the intermediate shaft 11, the sun gear 26, the planet gears 28, the planet carrier 29, the quill shaft 30, the sun gear 38, the planet gears 40, the ring gear 39, the ring gear 43, the planet gears 44, and the planet carrier 45 to the output shaft 12. The planet gear set 14 divides the power flow into two paths, one being directly through the shaft 11 and the other being through the sun gear 26; and the planet gear set 18 recombines the power with the sun gear 42 supplying power from one path and the ring gear 43 supplying power from the other path. The clutch 16 locks together the elements of the gear set 17 as in previous drives, and the clutches 15 and 16 in series lock together the ring gear 27 and carrier 29 so that the elements of the gear set 14 also rotate as a unit. Therefore, the ring gear 39 and the connected ring gear 43 of the planet gear set 18 are driven in the forward direction at the speed of the intermediate shaft 11. Since the sun gear 42 and the ring gear 43 of the planet gear set 18 are rotating at the same speed and in the same direction, the planet gears 44, the planet carrier 45 and the output shaft 12 will be rotated at the same speed, which speed is that of the intermediate shaft 11.

The reverse speed drive is completed by engaging the brake 19 and the clutch 15. The power flows in two paths, the one being through the intermediate shaft 11, the sun gear 42, the planet gears 44 and the planet carrier 45 to the output shaft 12 and the other path being through the sun gear 26, the planet gears 28, the ring gear 27, the clutch 15, the planet carrier 41, the planet gears 40, the ring gear 39, the ring gear 43, the planet gears 44, and the planet carrier 45 to the output shaft 12. The planet gear set 14 divides the power flow into two paths, the one being directly through the shaft 11 and the other being through the sun gear 26; and the planet gear set 18 recombines the power with the sun gear 42 supplying power from one path and the ring gear 43 supplying power from the other path. The brake 19, which is engaged with the clutch 15 for completion of this drive, functions to hold the planet carrier 29 of the gear set 14 against rotation, so that the carrier 29 functions as a reaction element for the gear set 14, and the brake 19 through the carrier 29 and the quill shaft 30 holds the sun gear 38 of the gear set 17 against rotation, so that the sun gear 38 functions as a reaction element for the gear set 17. The sun gear 26 is driven by the intermediate shaft 11, and the planet gears 28 drive the ring gear 27 in the reverse direction at a reduced speed. The clutch 15 locks the ring gear 27 and the planet carrier 41 together so that the planet carrier 41 is rotated reversely at the same speed as the ring gear 27. The planet gears 40 drive the ring gear 39 in the reverse direction at a speed which is increased with respect to that of the shaft 30, with the sun gear 38 being held stationary by the brake 19 and thus functioning as the reaction element of the gear set 17. The ring gear 43 is connected to the ring gear 39 and thus rotates in the same direction and at the same speed as the ring gear 39. The result of the rotation of the sun gear 42 driven in the forward direction at the same speed as the shaft 11 and the reverse rotation of the ring gear 43 is to cause the planet carrier 45 and the output shaft 12 to rotate reversely at a relatively low speed with respect to that of intermediate shaft 11.

As an example of the drive ratios provided by the transmission described, attention is directed to FIGURE 1A of the drawings where there is reproduced a table summing up the operations of one specific embodiment of the transmission shown in FIGURE 1 in which each sun gear is formed with 55 teeth and each ring gear is formed with 89 teeth. It is particularly to be noted that, since all ring gears are of the same size and all sun gears are of the same size so that the gear sets 14, 17 and 18 are identical, constant ratio steps are provided between the low, second, third and fourth or high forward drive ratios, the ratio step between any two ratios being that value which is multiplied with the numerical value of one ratio in order to obtain the value of the next ratio.

Thus it has been disclosed that by using multiples of a simple planetary gear set comprising a sun gear, a ring gear and a plurality of planet gears, transmissions may be constructed to provide a wide range of speed drives, and, provide equal or substantially equal ratio steps between successive forward speed drives. Transmissions embodying the principles of this invention may be constructed with reduced cost, since the gear sets are all of the same size, i.e., the corresponding gear elements of the planet gear sets are the same size and are provided with the same number of teeth thereon, and therefore the corresponding elements are interchangeable.

It is to be understood that the embodiment described herein is by way of illustration only and not by way of limitation, and the scope of the invention is defined solely by the appended claims which should be construed as broadly as the prior art will permit.

I claim:

1. In a transmission, the combination of a drive shaft, a driven shaft, a planetary gear set having a sun gear element and a ring gear element and planet gears in mesh with said sun and ring gear elements and a carrier element for said planet gears, said sun gear being connected to said drive shaft and said carrier being connected to said driven shaft, planetary gearing drivingly connected between said drive shaft and said ring gear, said planetary gearing comprising a second and third pair of planet gear sets having drivingly interconnected elements and having the same size elements as said first mentioned gear set, one of said elements of said second gear set being connected with said ring gear of said first gear set and one of said elements of said third gear set being connected with said drive shaft, a pair of clutches one of which locks together two elements of said second gear set and both of which when locked connect together two elements of said third gear set, and a brake for an element of each of said second and third gear sets, said clutches and brakes being selectively engageable for driving said third element of said first gear set reversely or forwardly at different speeds from said drive shaft for providing a plurality of two path power flow forward drive power trains between said shafts.

2. In a transmission, the combination of a drive shaft, a driven shaft, a first planetary gear set having a sun gear and a ring gear and planet gears in mesh with said sun and ring gears and a carrier for said planet gears, said carrier being connected with said driven shaft and said sun gear being connected with said drive shaft, planetary gearing for drivingly connecting said drive shaft and said ring gear and including second and third planet gear sets which have the same size gears and carrier as said first gear set, said ring gear of said second gear set being connected with said ring gear of said first gear set and said sun gear of said third gear set being connected with said drive shaft, said sun gear of said second gear set being connected to said carrier of said third gear set, a clutch for connecting together said carrier and sun gear of said second sun gear set and a clutch for connecting said ring gear of said third gear set with said carrier of said second gear set, a brake for said carrier of said second gear set and a brake for said ring gear of said third gear set, said brakes being engageable for driving said ring gear of said first gear set reversely for a low speed two path forward drive between said shafts, said brake for said carrier of said second gear set being engageable along with said clutch connecting said carrier and said sun gear of said second gear set to brake said ring gear of said first set to provide a higher two path forward drive between said shafts, said last named clutch and said other brake being engageable to drive said ring gear of said first gear set forwardly to provide a still higher two path forward drive between said shafts and said two clutches being engageable for locking up the members of all of said gear sets to provide a high speed two path forward drive between said shafts.

References Cited in the file of this patent

UNITED STATES PATENTS

| | | |
|---|---|---|
| 1,694,808 | Brown et al. | Dec. 11, 1928 |
| 2,180,671 | Fleischel | Nov. 21, 1939 |
| 2,355,000 | Liebrecht | Aug. 1, 1944 |
| 2,467,226 | Place | Apr. 12, 1949 |
| 2,530,310 | McFarland | Nov. 14, 1950 |
| 2,725,763 | Stoeckicht | Dec. 6, 1955 |

FOREIGN PATENTS

| | | |
|---|---|---|
| 712,527 | Germany | Oct. 21, 1941 |